United States Patent [19]
Lohr

[11] 3,786,336

[45] Jan. 15, 1974

[54] APPARATUS FOR MEASURING THE ANGULAR DISPLACEMENT AND THE ANGULAR VELOCITY OF A ROTATION MEMBER

[75] Inventor: Thomas E. Lohr, Mount Clemens, Mich.

[73] Assignee: Allied Chemical Corporation, New York, N.Y.

[22] Filed: Apr. 11, 1972

[21] Appl. No.: 242,961

[52] U.S. Cl. .................. 322/51, 310/156, 317/5, 322/32
[51] Int. Cl. .................................. H02p 9/40
[58] Field of Search .................. 322/31, 32, 51; 324/163, 174; 318/326, 327, 341, 603; 310/152, 156; 317/5

[56] References Cited
UNITED STATES PATENTS

| | | | |
|---|---|---|---|
| 3,264,541 | 8/1966 | Mell | 318/341 X |
| 3,072,813 | 1/1963 | Reijnst et al. | 310/156 |
| 3,671,788 | 6/1972 | Knudson et al. | 310/156 |

*Primary Examiner*—James D. Trammell
*Attorney*—Johnathan Plaut et al.

[57] ABSTRACT

Apparatus for measuring the angular displacement and the angular velocity of a rotating member. Mechanical energy causing angular motion of the rotating member is transformed into electrical energy in the form of a plurality of electrical pulses which are counted during a preselected time interval. Variations in the magnitude of the cycle do not alter the accuracy of the apparatus. Thus, the angular displacement and the angular velocity of the rotating member can be economically measured with greater accuracy than has previously been possible with voltage dependent apparatus.

6 Claims, 5 Drawing Figures

PATENTED JAN 15 1974 3,786,336

APPARATUS FOR MEASURING THE ANGULAR DISPLACEMENT AND THE ANGULAR VELOCITY OF A ROTATION MEMBER

BACKGROUND OF THE INVENTION

1. Field of the Invention

This invention relates to apparatus for measuring the angular velocity and the angular displacement of a rotating member such as the shaft of an automobile speedometer cable, and more particularly to an improved, relatively inexpensive, compact generator for inducing a number of electrical pulses which varies in direct proportion to the angular displacement of the rotating member and, when correlated with a preselected time interval, varies in direct proportion to the angular velocity of the rotating member.

2. Description of the Prior Art

The apparatus conventionally used to measure the angular velocity of a rotating member such as the speedometer shaft of a motor vehicle depends upon the electromotive force induced by rotation of a permanent magnet within the rim of an inductor. Manufacturing tolerances suitable for mass production of the apparatus occasionally permit variations in the strength of the magnet and its distance from the inductor. These variations alter the induced electromotive force, thereby creating a nonlinear relationship between the magnitude of the electromotive force and the angular velocity of the magnet. As a result, the angular velocity of the magnet, and hence of the rotating member connected thereto, cannot be accurately established in an economical manner. Furthermore, voltage dependeent apparatus of the type described cannot be used to economically measure the angular displacement of the rotating member.

SUMMARY OF THE INVENTION

The present invention provides an economical apparatus whereby the angular motion of a rotating member produces a train of electrical pulses which are counted and correlated with the angular displacement and the angular velocity of the rotating member. Mechanical energy causing angular motion of the rotating member is transformed into electrical energy in the form of an alternating electrical current by a generator. The generator has a field assembly, such as an inductor, disposed about a flux generating means which is joined to the rotating member for synchronous motion with respect thereto. A rectification means connected to the field assembly converts the alternating current into a unidirectional current. The cycles of the current are linearly reproduced by an amplification means connected to the rectification means. A wave shaping means in series with the amplification means shapes the cycles into a pluse train. The pulses of the pulse train are then counted by a counting means. The angular displacement is obtained by multiplying the number of pulses by the angular displacement of the flux generating means necessary to produce one pulse. In order to determine the angular velocity of the rotating member, the above apparatus is additionally provided with a time control means for selectively permitting the pulse train to pass through the counting means during a preselected time interval. The angular velocity of the rotating member is obtained by multiplying the number of pulses counted during the preselected time interval times the angular displacement of the flux generating means necessary to produce one pulse.

In a specific embodiment of the generator, the flux generating means includes a permanent magnet which is heteropolar and which has an outer peripheral surface. The poles of the magnet are substantially equally spaced on the outer peripheral surface of the magnet and comprise a large number, as in the range of from about 76 to 100 poles. A number of pole plates corresponding to the number of poles on the magnet and substantially equally spaced around the outer peripheral surface of the magnet are collectively provided by a plurality of pole pieces which surround a wound wire coil, thereby forming the inductor of the field assembly. The magnet is connected to an armature which is rotatably supported by a housing and which joins with the rotating member in a conventional way for synchronous motion with respect thereto. Each of the poles of the magnet and the pole plates of the inductor extend substantially parallel to the axis of rotation of the magnet. Angular movement of the rotating member causes angular movement of the magnet. The poles of the magnet move relative to the pole plates of the inductor and change the orientation of the magnet field in the pole pieces. An alternating current having a number of cycles equal to the number of inductor pole plates indexed by a given pole on the magnet is thereby induced in the coil. The cycles are then rectified, amplified, shaped into pulses having a form compatible with digital logic circuitry, and counted during a preselected time interval.

Since the distance between each of the poles of the magnet is substantially the same, the angular displacement is directly proportional to the number of pulses. Moreover, each revolution of the magnet produces a number of pulses equal to th number of poles of the magnet. Thus, a linear relationship is established between the number of pulses counted during the preselected time interval and the number of revolutions of the magnet. Since the latter number varies directly with the angular velocity of the rotating member, the number of electrical pulses counted during the preselected time interval varies in direct proportion to the angular velocity.

The apparatus of this invention has significant advantageous structural features. Due to the large number of poles employed, the angular distance displaced by the flux generating means in order to index one pole and create one pulse is extremely small, as in the range of from about 3.6° to 4.7°. The angular displacement of the rotating member is not based upon the average magnitude of a plurality of pulses, as in voltage dependent apparatus, but is immediately ascertainable upon the receipt of each pulse by the counting means regardless of the angular velocity of the flux generating means. As a result, the angular displacement of the rotating member can be economically measured in less time and with greater accuracy than has previously been possible with voltage dependent apparatus. Moreover, variations in the strength of the magnet and its distance from the inductor alter the induced electromotive force but do not change the number of pulses per revolution. Manufacturing tolerances suitable for mass production can advantageously be employed without appreciably altering the accuracy of the apparatus. Thus, both the angular velocity and the angular acceleration can be rapidly and accurately determined in an extremely economical manner.

BRIEF DESCRIPTION OF THE DRAWINGS

The invention will be more fully understood and further advantages will become apparent when reference is made to the following detailed description of the preferred embodiment of the invention and the accompanying drawings in which.

DESCRIPTION OF THE PREFERRED EMBODIMENTS

The rotating members with which the present apparatus can be mechanically joined may be fabricated in a number of diverse sizes and configurations. As a consequence, the invention will be found to function with most varieties of rotating members. For illustrative purposes, the invention is described in connection with a rotating member located within the transmission and comprising part of the velocity and distance determining system of a motor vehicle. It will be readily appreciated that the invention can be employed for similar and yet diversified uses, such as the provision of electrical information useful to (1) ignition timing apparatus of emission and turnpike cruise control systems, (2) digital speed indicators and other devices having operation related to the speed of the motor vehicle, (3) rotary antennae and other position sensing systems and (4) servomechanisms and the like.

Figure 1:
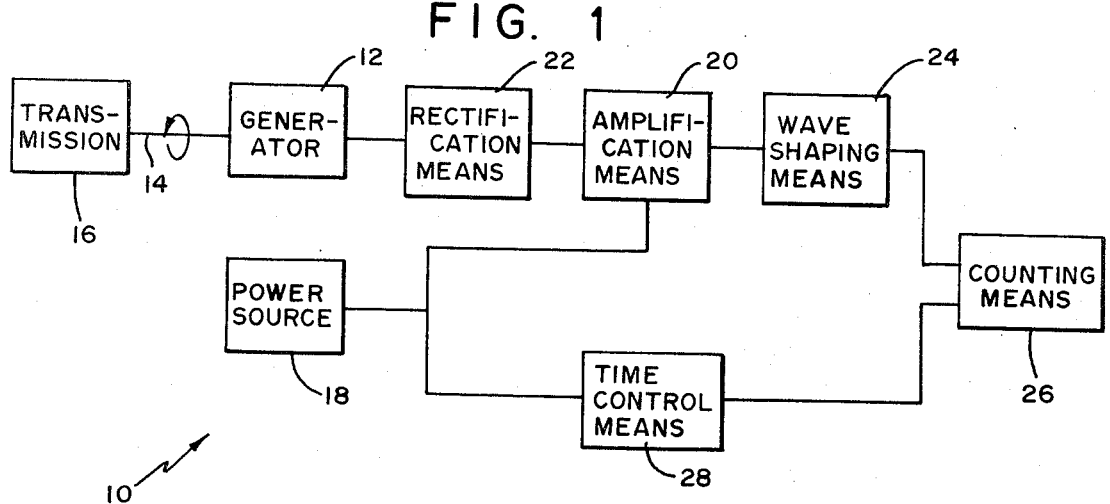
FIG. 1 is a diagramatic representation of apparatus for measuring the angular velocity and the angular displacement of a rotating member.

Referring to the drawings, there is illustrated in FIG. 1, a preferred form of apparatus for determining the angular velocity and the angular displacement of a rotating member. The apparatus shown generally at 10, includes a generator 12 for providing an alternating current having a plurality of cycles. Such generator 12 is connected by means of a flexible shaft 14 to a rotating member (not shown) for synchronous motion with respect thereto. The connection, shown as indirect, can, of course, be made directly to the shaft of the rotating member. As previously noted, the rotating member is located within the transmission 16 and may comprise part of the velocity and distance determining system of a motor vehicle. The apparatus 10 further includes a power source 18 which may comprise the storage battery of the vehicle. A circuit means in the form of two parallel paths is electrically connected to the power source. The first path includes a rectification means 22 connected to the generator 12 for converting the alternating current into a unidirectional current, an amplification means 20 connected to the rectification means for linear reproduction of the cycles, wave shaping means 24 for converting the cycles into a train of pulses and counting means 26 for counting the number of pulses. The second path includes a time control means 28 in series with said counting means for selectively permitting the pulse train to pass through the counting means during a preselected time interval.

Figure 2:
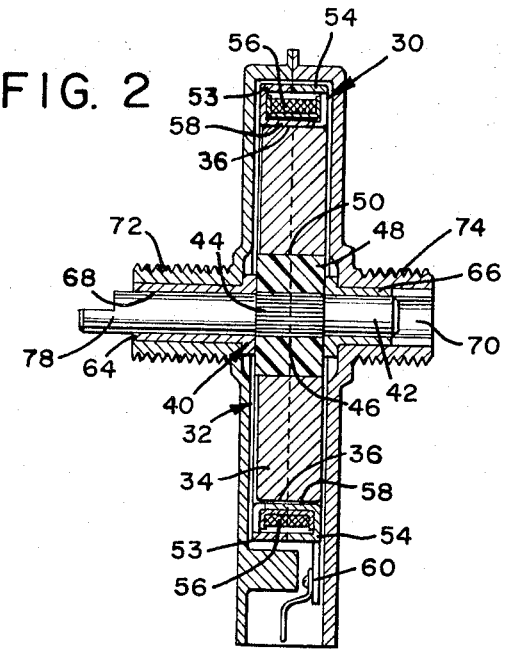
FIG. 2 is a front elevation of the generator shown in FIG. 1.
Figure 3:
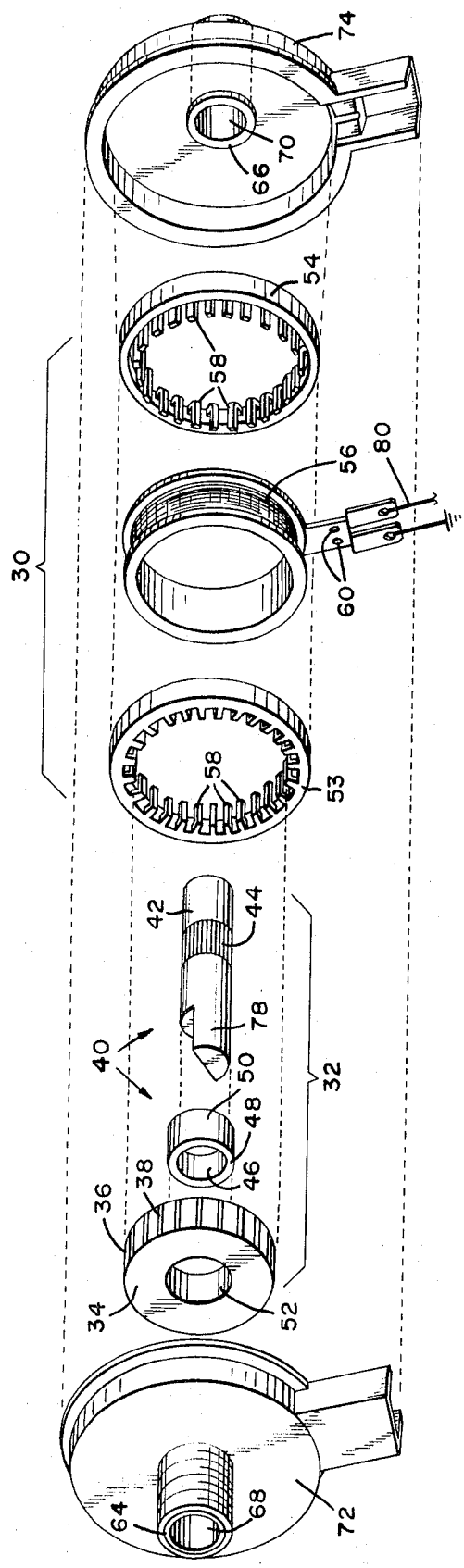
FIG. 3 is an exploded perspective view of the generator of FIG. 1.

Referring to FIGS. 2 and 3, the generator 12 includes a field assembly such as an inductor generally designated 30, disposed around a flux generating means generally designated 32. The flux generating means 32 includes a permanent magnet 34 which is generally cylindrical in configuration, is heteropolar, and has an outer peripheral surface 36. Magnet 34 can be molded to the shape illustrated in the drawings and preferably is a ceramic ferrite permanent magnet formed of a magnetic material having a low permeability and a relatively high coercivity. One type of material that is suitable is a barium ferrite magnetic material.

Figure 4:
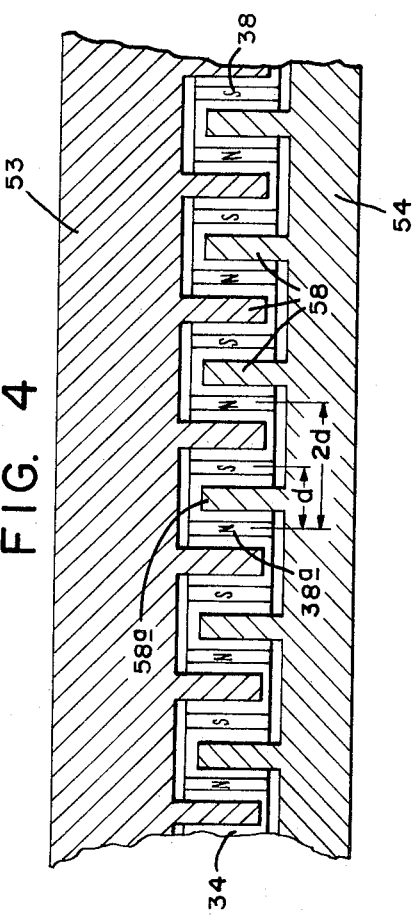
FIG. 4 is a diagramatic representation illustrating the flux generating means and its relation to the field assembly of the generator illustrated in FIG. 1.

The magnet 34 is magnetized to provide magnetized sectors such as poles 38 having the polarity indicated in FIG. 4. A magnetizing fixture is employed to permanently magnetize the ferrite composition into alternate opposite polarity sectors, thereby creating a heteropolar magnet. The magnetizer can be of a pulse type which is capable of magnetizing ferrite material.

The poles 38 of the magnet 34 have substantially the same dimensions and are substantially equally spaced from about 3.6° to about 4.7° apart on the outer peripheral surface 36. The number of poles is preferably large, in the range of from about 76 to 100 poles for a magnet having a circumference of about 1.90 to 2.50 inches. It will be understood that the number of poles and the spacing thereof can vary, depending upon the circumference of the peripheral surface 36 and the dimensions of the poles.

The inductor 30 is provided with a plurality of pole pieces 53 and 54 constructed of low carbon steel or other suitable material. Such pole pieces 53 and 54 collectively surround a coil 56, preferably formed of 152 turns of magnet wire having an American Standard guage number of about 33. The ends of the wire are secured to terminals 60 by mechanical fasteners 72 such as rivets or the like. Pole pieces 53 and 54 are each provided with a plurality of pole plates 58. The number of pole plates 58 collectively provided by the pole pieces 53 and 54 corresponds to the number of poles 38 non the magnet 34. Each of the pole plates 58 are substantially equally spaced around the outer peripheral surface 36 of the magnet 34.

The magnet 34 is connected to an armature assembly, generally designated 40. Such armature assembly includes an armature shaft 42 formed of SAE 1108–1112 steel or other suitable metal and having a knurled portion 44, which can be placed in driving engagement with the inner peripheral surface 46 of insulating member 48. The insulating member 48 is constructed of plastic such as nylon or other suitable insulating material. Outer peripheral surface 50 of insulating member 48 is rigidly connected to the inner peripheral surface 52 of magnet 34 by a suitable epoxy resin adhesive.

The armature shaft 42 has sections journalled respectively in bushings 64 and 66, which are press fit within bores 68 and 70 of housing members 72 and 74. Each of the housing members 72 and 74, the flux generating means 32 and the field assembly 30 can be "stack-assembled" in the order shown in FIG. 3 for ease of handling during manufacture. When assembled, the armature 40 is rotatably supported by the housing members 72 and 74, which are oil resistant and can be tightly sealed together by ultrasonic welding so as to surround the electrical components of the generator and protect them from contamination, tampering and accidental damage. End 78 of armature 42 joins with the shaft 14, which is adapted for connection to the rotating member (not shown) in the conventional way. The housing members 72 an 74 are preferably constructed of heat stabilized nylon or other suitable material. The bushings are preferably constructed of sintered bronze or the like.

In FIG. 4 the relationship between the pole plates 58 of pole pieces 53 and 54 and the poles 38 of the magnet 34 is shown schematically. Angular movement of the rotating members is transmitted through shaft 14 to the flux generating means 32, which rotates at the same angular velocity as the rotating member. The poles 38 of the magnet 34 move relative to the pole plates 58 of the pole pieces 53 and 54. Each of the poles 38 of magnet 34 and the pole plates 58 of the pole pieces 53 and 54 extend substantially parallel to the axis of rotation of the magnet 34. When a given pole 38a is displaced a distance d, it indexes a given pole plate 58a of the pole piece 53, thereby affecting the polarity in the pole plate 58a and of the pole piece 53 connected to it. Inasmuch as the magnet 34 is heteropolar, a displacement distance of d reverses the orientation of the magnetic field in the pole piece 53. In like manner rotation of the flux generating means changes the orientation of the magnetic field in pole piece 54. The change in the orienation of the magnetic field in the pole pieces 53 and 54 induces an alternating current in the coil 56. If a field assembly having 100 pole plates is disposed around a 100 pole flux generating means in the manner described above, each cycle of the current corresponds to an angular displacement (2d) of 7.2°. By employing such conventional methods as full wave rectification or level shifting wherein the alternating current is impressed upon a direct current voltage so that the negative excursions of the alternating current are positive with respect to ground a discrimination of up to one-half cycle is easily obtained. Thus, an angular displacement ($d$) of 3.6° can be detected.

Figure 5:
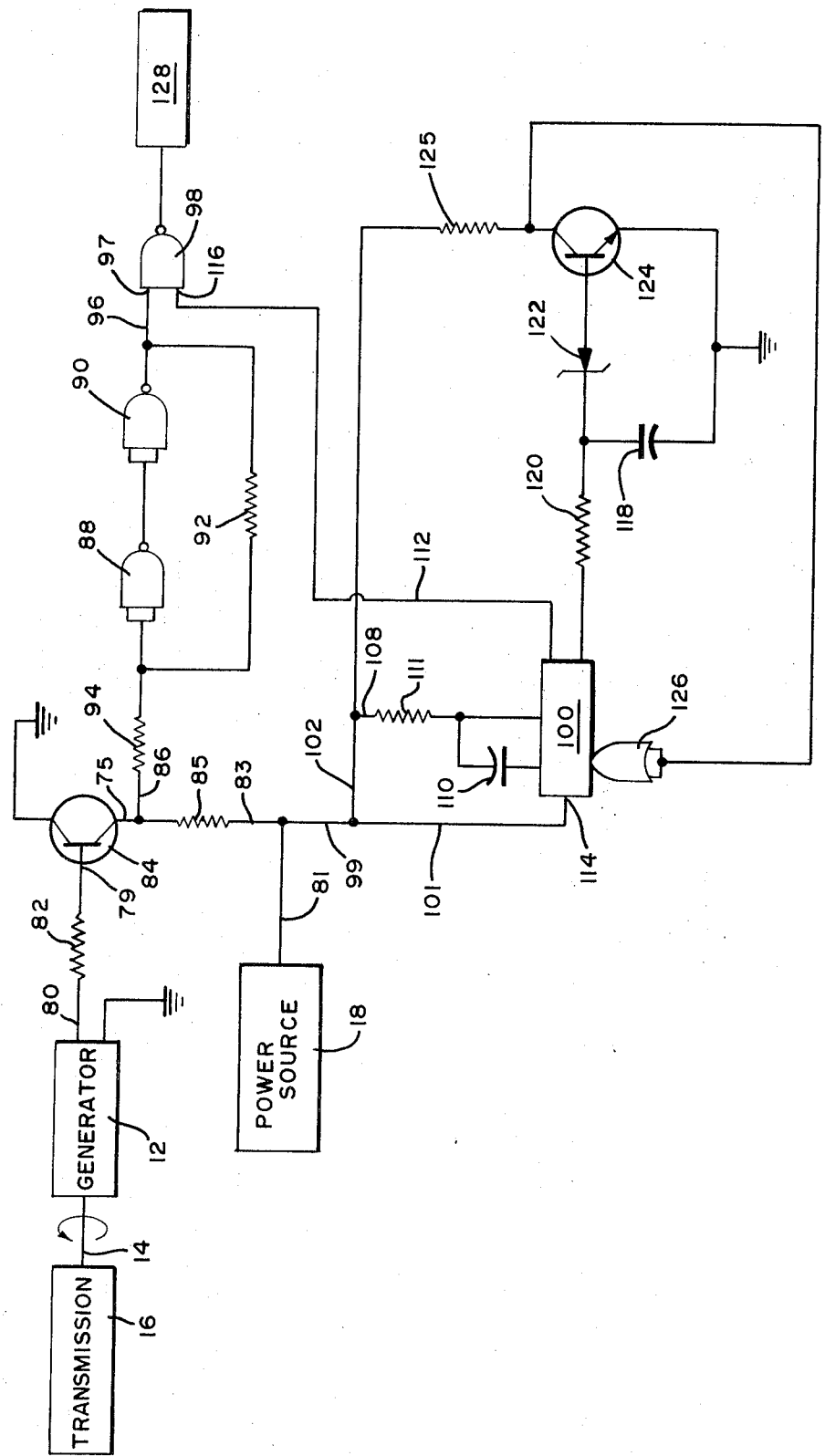
FIG. 5 is a schematic electrical diagram of the rectification, amplification, wave shaping, counting and time control means shown in FIG. 1.

In FIG. 5 the amplification, rectification, wave shaping, time control and counting means of FIG. 1 are shown schematically. Angular movement of the rotating member within transmission 16 causes angular movement of shaft 14 and magnet 34 within generator 12, thereby inducing an alternating current having a plurality of cycles. The alternating current is transmitted to line 80 which is electrically connected to terminals 60 of generator 12. After passing through a resistor 82 the current enters a transistor 84 through an input terminal 79. The transistor 84 is used to rectify and amplify the alternating current signal. Current from power source 18, is passed through line 81, line 83 and load resistor 85 to an output terminal 75 of the transistor 84 for use in the linear reproduction of the cycles. Load resistor 85 limits the current passing from power source 18 through the transistor and facilitates detection of the current change. The resistance value of the load resistor 85 is generally in the order of about 15,000 ohms. Resistor 82 limits the current to the transistor and generally has a resistance value suited to perform this function, as in the order of about 10,000 ohms. After exiting the transistor 84, the signal passes through line 86 to wave shaping means 24 which shapes the current to a form compatible with digital logic circuitry. The wave shaping means preferably includes a resistor 94 in series with two series connected nand gates 88 and 90 and a resistor 92 in parallel with nand gates 88 and 90 which serves as a feedback path from the output of nand gate 90 to the input of nand gate 88. One type of wave shaping means which is suitable is a Schmitt trigger circuit. Such wave shaping apparatus produces a steady low level output until the current reaches a first preselected threshold value, whereupon the apparatus produces a steady high level output. When the current reaches a second preselected value, the apparatus again produces the steady low level output. Upon exiting the wave shaping means 24 in the form of a train of pulses, the signal passes through line 96 to terminal 97 of nand gate 98 which either permits or inhibits passage of the current therethrough, as described hereinafter in more detail.

Current from power source 18 reaches a monostable multivibrator 100 through lines 81, 99, 101, 102, and 108. As a result, the monostable vibrator 100 turns on for a time interval determined by capacitor 110 and resistor 111. The capacitor 110 has a capacitance in the order of about 25 microfarads. Resistor 111 has a resistance value of about 15,000 to 20,000 ohms. The connection between power source 18 and terminal 114 of multivibrator 100 permits the multivibrator 100 to operate in a monostable form. During the on state an electrical current passes through line 112 to terminal 116 of nand gate 98. During the off state, the current does not pass through line 112 but rather is passed through a suitable time delay circuit comprised of capacitor 118, resistor 120, Zenor diode 122, transistor 124 and load resistor 125 to the trigger 126 of the monostable multivibrator 100. The time interval during which the current is permitted to pass through the time delay circuit to retrigger multivibrator 100 via the input of trigger 126 is determined by resistor 120, capacitor 118 and Zenor diode 122. Capacitor 118 has a capacitance in the order of about 1.0 microfarad. The resistance value of resistor 120 and 125 are about 100,000 ohms and 2,200 ohms, respectively. As long as current passes through line 112 the signal from the wave shaping means 24 is permitted to pass through nand gate 98. When the current does not pass through line 112, the signal from the wave shaping means 24 is prevented from passing through nand gate 98. As a result, the pulse train from wave shaping means 24 passes through nand gate 98 during a time interval which can be preselected by regulation of the multivibrator 100 in the conventional way.

The number of pulses of the pulse train which pass through the nand gate 98 during the preselected time interval are counted and converted into a binary number by a counting means such as a decade counter 128 or other suitable means. It should be understood that the number of decade counters employed can vary depending on the length of the preselected time interval and the frequency of the pulses to be counted. Such considerations should be understood by those skilled in the art.

As previously noted, the distance between each of the poles 38 of the magnet 34 of flux generating means 32 is substantially the same. The armature 40 of flux generating means 32 is connected by means of shaft 42 to the rotating member (not shown) so that the angular displacement of each of the rotating member, the shaft 42 and the magnet 34 is substantially the same. As a result, the number of pulses of the pulse train from the wave shaping means 24 which pass through the nand gate 98 and are counted is directly proportional to the angular displacement of the flux generating means 32 during the preselected time interval. Each revolution of the magnet 34 produces a number of pulses equal to the number of poles 38 of the magnet 34. Thus, a linear relationship is established between the number of pulses counted during the preselected time interval and the number of revolutions of the magnet 34. For any particular angular velocity of the magnet 34, armature 40, shaft 42 and rotating member (not shown) a particular number of pulses pass through the nand gate 98 and are counted by the counting means 128. The number of pulses counted can be converted to a binary number and used as the controlling input for (1) ignition timing apparatus of emission and turnpike cruise control systems, (2) digital speed indicators and other devices having operation related to the speed of a motor vehicle, (3) rotary antennae and other position sensing systems and (4) servomechanisms and the like.

The apparatus 10 which has been disclosed herein can, of course, be modified in numerous ways without departing from the scope of the invention. Angular displacement of the rotating member can be measured without the time control means 28; such means can be eliminated for position sensing applications. The electrical components employed to rectify, amplify, shape and count the cycles of the alternating current from the generator 12 can vary depending on the circumference of the flux generating means 32, the number of poles 38, the construction of the field assembly, and the strength of power source 18. Such modifications are intended to fall within the scope of the invention as defined by the subjoined claims.

Having thus described my invention in rather full detail, it will be understood that these details need not be strictly adhered to but that various modifications may suggest themselves to one skilled in the art. It is, accordingly, intended that the specification be interpreted as illustrative and not in a limiting sense.

I claim:

1. Apparatus for measuring the angular displacement and the angular velocity of a rotating member, comprising:

a. a generator having a field assembly disposed about a flux generatng means for providing an alternating current having a plurality of cycles;
   b. said flux generating means being joined with the rotating member for synchronous motion with respect thereto;
   c. rectification means connected to Said field assembly for converting said alternating current into a unidirectional current;
   d. amplification means connected to said rectification means for linear reproduction of said cycles;
   e. wave shaping means in series with said amplification means for converting said cycles into a train of pulses;
   f. counting means in series with said wave shaping means for counting the number of pulses; and
   g. time control means in parallel with said rectification, amplification and wave shaping means and connected to said counting means for selectively permitting the pulse train to pass through the counting means during a preselected time interval.

2. Apparatus as recited in claim 1 wherein said rectification means and said amplification means collectively include a transistor having an input terminal connected in series with said generator and a load resistor connected between a power source and an output terminal of said transistor.

3. Apparatus as recited in claim 2 wherein said wave shaping means includes a resistor in series with two nand gates and a feedback resistor in parallel with said nand gates.

4. Apparatus as recited in claim 3 wherein the counting means includes a nand gate in series with said wave shaping means.

5. Apparatus as recited in claim 4 wherein the time control means is in the form of a monostable multivibrator connected between said power source and said counting means.

6. Apparatus as recited in claim 5 wherein said generator includes a housing, said flux generating means includes an armature rotatably supported by said housing and a heteropolar permanent magnet mounted on said armature for rotation about an axis and said magnet has about 76 to 100 poles.

* * * * *